(12) United States Patent
Kinoshita et al.

(10) Patent No.: US 8,077,161 B2
(45) Date of Patent: Dec. 13, 2011

(54) SCREEN-INPUT IMAGE DISPLAY DEVICE

(75) Inventors: Masayoshi Kinoshita, Oita (JP);
Takeshi Sato, Kokubunji (JP)

(73) Assignee: Hitachi Displays, Ltd., Chiba (JP)

( * ) Notice: Subject to any disclaimer, the term of this patent is extended or adjusted under 35 U.S.C. 154(b) by 557 days.

(21) Appl. No.: 12/292,131

(22) Filed: Nov. 12, 2008

(65) Prior Publication Data
US 2009/0128518 A1 May 21, 2009

(30) Foreign Application Priority Data

Nov. 15, 2007 (JP) .................................. 2007-296311

(51) Int. Cl.
*G06F 3/041* (2006.01)
(52) U.S. Cl. .......... 345/174; 345/173; 345/55; 345/103; 345/104
(58) Field of Classification Search .................. None
See application file for complete search history.

(56) References Cited

U.S. PATENT DOCUMENTS

| | | | |
|---|---|---|---|
| 7,288,716 B2 * | 10/2007 | Yamada et al. | 174/36 |
| 2004/0217945 A1 | 11/2004 | Miyamoto et al. | |
| 2007/0008299 A1 | 1/2007 | Hristov | |
| 2008/0143906 A1 * | 6/2008 | Allemand et al. | 349/43 |

FOREIGN PATENT DOCUMENTS

| | | |
|---|---|---|
| JP | 2003-066417 | 8/2001 |
| JP | 2007-018515 | 7/2006 |

* cited by examiner

*Primary Examiner* — Muhammad N Edun
(74) *Attorney, Agent, or Firm* — Stites & Harbison PLLC; Juan Carlos A. Marquez, Esq.

(57) ABSTRACT

The screen-input image display device has a touch panel for outputting touched locations of a finger or the like in contact with a display panel screen; and a sensing circuit for sensing coordinates of the touched locations based on the output of the touch panel. The touch panel has a transparent conductor film which is single layer on a transparent substrate, the transparent conductor film being patterned into numerous electrode pads arranged in rows and columns of a two-dimensional matrix, and surface areas of the electrode pads vary depending on the location of the touch areas. Coordinates of the touch locations are sensed based on the proportion of charge signals of the touch locations due to differences in surface areas of the electrode pads.

5 Claims, 16 Drawing Sheets

SCREEN-INPUT IMAGE DISPLAY DEVICE

CLAIM OF PRIORITY

The present application claims priority from Japanese patent application JP 2007-296311 filed on Nov. 15, 2007, the content of which is hereby incorporated by reference into this application.

BACKGROUND OF THE INVENTION

1. Field of the Invention

The present invention relates to a screen-input image display device, and more particularly to a screen-input image display device incorporating a capacitive touch panel in an image display panel.

2. Description of the Related Art

There are screen-input image display devices which are equipped with a touch sensor (also referred to as a touch panel) that has the function of inputting data (screen-input function) when a user touches (touches or presses, referred to below simply as touching) a display screen such as a liquid crystal display panel with a finger or the like. Screen-input image display devices are used in mobile electronic devices such as PDA or portable terminals, various types of household electrical devices, and stationary customer guidance terminals such as unmanned receptionist machines. Known examples of such touch-input implementation systems include systems for sensing changes in the resistance or changes in the capacitance of parts that are touched, and systems for sensing changes in the luminous energy in parts that are blocked by touch.

FIG. 14 is a schematic view illustrating the structure of a touch panel used in a system for sensing changes in resistance. FIG. 15 is a conceptual view illustrating a method for sensing touch locations on the touch panel illustrated in FIG. 14. In the touch panel in FIG. 14, a solid transparent conductor film 2 is formed on one side of a substrate on the side where the display device is viewed, and electrode terminals 4 (4A, 4B, 4C, 4D) are provided in the four corners. As shown in FIG. 15, an alternating current signal AC is applied to the transparent conductor film 2 for sensing coordinates; current i1, i2, i3, and i4 flowing to current sensing resistors r1, r2, r3, and r4 located in the four corners is sensed; and the coordinates are calculated from the proportion of electrical resistance between the locations touched by the finger and the electrode terminals 4.

FIG. 16 is a conceptual view illustrating the structure of a touch panel used in a system for sensing changes in capacitance. In this touch panel, sensor cells X1, X2, and X3 in a direction X and sensor cells Y1, Y2, Y3, Y4, and Y5 in a direction Y are arranged on a transparent substrate; and each of the sensor cells in the Y direction is electrically connected by electrical wire connections 38, 40, and 41 which have been made outside the sensing areas. Coordinates which have been touched are sensed through the calculation of the level of current picked up by the X-direction sensor cells (electrode pads) X1, X2, and X3 and the Y-direction sensor cells Y1, Y2, Y3, Y4, and Y5.

Because touch panels in systems for sensing changes in capacitance can be formed with just a single transparent conductor film, the structure is simple, and a characteristic feature of systems for sensing changes in capacitance is that, unlike systems for sensing changes in resistance, input coordinates can be sensed without applying pressure to the display panel side.

JP-A 2003-66417 and 2007-18515 are examples disclosing a screen-input image display device in which changes in capacitance are sensed. JP-A 2003-66417 discloses a capacitive touch panel in which a location-sensing transparent conductive film is provided to the opposite side of a glass substrate equipped with counter electrodes for a liquid crystal display panel, and oscillating voltage is applied to the transparent conductor film, whereby current flowing to the touching finger is sensed, and the coordinates are sensed. JP-A 2007-18515 discloses a capacitor sensor equipped with a substrate, on one surface of which are arranged electrodes that comprise a transparent conductor film or the like, the electrodes being arranged in such a way as to define arrays of sensor cells arranged in rows and columns for forming sensing areas.

SUMMARY OF THE INVENTION

In the touch panel disclosed in JP-A 2003-66417, the current i1 through i4 flowing to the current sensing resistors located in the four corners of the rectangular transparent conductor film is sensed, and the coordinate data in the center is therefore calculated less accurately than in the peripheral parts of the substrate. In the capacitor sensor disclosed in JP-A 2007-18515, the electrical wire connections for connecting the numerous rows (and columns) of sensing electrodes arranged in a matrix intersect outside the sensing areas, resulting in the need for two layers of wiring, which requires a manufacturing process for that purpose and is one of the factors that limit cost reduction.

An object of the present invention is to provide a screen-input image display device including a capacitive touch panel that has higher accuracy and that is less expensive.

In the present invention, a thin conductive film for forming the capacitive touch panel used in the screen-input image display device is patterned so as to result in the arrangement of a plurality of groups of numerous electrode pads. The electrode pads, which are formed at the same time they are patterned, are connected per group and per row by wiring. The sizes of the electrode pads vary per touch area location, and the coordinates are sensed based on charge signals.

In specific example, contact by a user's finger is determined on the basis of the total charge level, and contact locations are normalized by the total charge levels. The capacitance is a continuous distribution, and the plurality of electrode pads is arranged so that the mean level in the pads is the mean on the coordinates of the contact locations. The change in capacitance during contact is understood to occur in the time it takes for charging to occur with a constant current source, and this time is counted by a timer circuit.

An outline of typical aspects of the invention disclosed in this application will be briefly described below.

The screen-input image display device relating to the present invention comprises a touch panel for outputting signals of touched locations of a finger or the like of a user in contact with a display panel screen, the panel being superimposed via touch areas on the screen; and a sensing circuit for sensing coordinates of the touched locations based on the output of the touch panel. The touch panel has a transparent conductor film which is single layer on a transparent substrate, the transparent conductor film being patterned into numerous electrode pads arranged in rows and columns of a two-dimensional matrix, and surface areas of the electrode pads vary depending on the location of the touch areas. Coordinates of the touch locations are sensed based on proportion of charge signals of the touch locations due to differences in the surface areas of the electrode pads.

In an aspect of the present invention, the electrode pads arranged in a row direction and a column direction of the matrix of the touch panel may comprise three groups that are repeating every three rows parallel in the row direction, and, viewing the matrix planarly, surface areas of a first row of electrode pads corresponding to one of the three groups decrease from the left to the right in the row direction and decrease from the bottom to the top in the column direction, surface areas of a second row of electrode pads corresponding to another one of the three groups are constant going laterally in the column direction and decrease from the top to the bottom of the rows, and surface areas of a third row of electrode pads corresponding to another one of the three groups increase from the left to the right in the column direction and increase from the top to the bottom in the row direction.

In another embodiment of the present invention, the electrode pads arranged in a row direction and a column direction of the matrix of the touch panel may comprise two groups that are repeating every two columns parallel in the row direction, and, viewing the matrix planarly, surface areas of a first row of electrode pads corresponding to one of the two groups decrease from the left to the right in the row direction and decrease from the bottom to the top in the column direction, and surface areas of a second row of electrode pads corresponding to the other of the two groups decrease from the left to the right in the row direction and decrease from the top to the bottom in the column direction.

The electrode pads arranged in a row direction and a column direction of the matrix are not limited to the three groups or two groups noted above, and may be formed in a plurality of groups of four or more, but as this arrangement will result in a larger circuit scale for computing coordinates, three groups or two groups are more practical.

According to the present invention, the circuit scale for sensing the locations touched by fingers (coordinates) is smaller, thus allowing costs to be reduced and coordinates to be sensed with high accuracy. Specifically, (1) the transparent conductor film is a single layer, and relatively large electrodes can be made, thus minimizing the loss of transmittance in a display panel such a liquid crystal display panel in the bottom layer. (2) There can be a minimum of two sensing terminals, making it easier to produce drive circuits and touch panel connections. (3) The present invention can be implemented with two or three terminal connection terminals, making it possible to avoid increasing sensing circuits and the number of terminals, and to help lower costs and conserve energy. (4) No wire resistance is used to sense coordinates, which are sensed on the basis of the proportions of charge level, thereby avoiding the effects of irregular resistance or the like, and improving the accuracy of sensed coordinates.

According to the present invention, it is possible to bring about a clear touch panel of high transmittance in which transparent conductor film patterns are less visible, and the higher coordinate sensing resolution allows more precise screen area selection, character input, and the like. Applicable display panels are not limited to liquid crystal display panels, but also include any intermediate to small type of display such as organic EL display devices, large scale displays such as plasma displays, and any touch panels such as POS (point of sale) terminals in retail stores.

DESCRIPTION OF THE PREFERRED EMBODIMENTS

Embodiments of the present invention will be described in detail hereinafter with reference to the accompanying drawings.

First Embodiment

Figure 1:
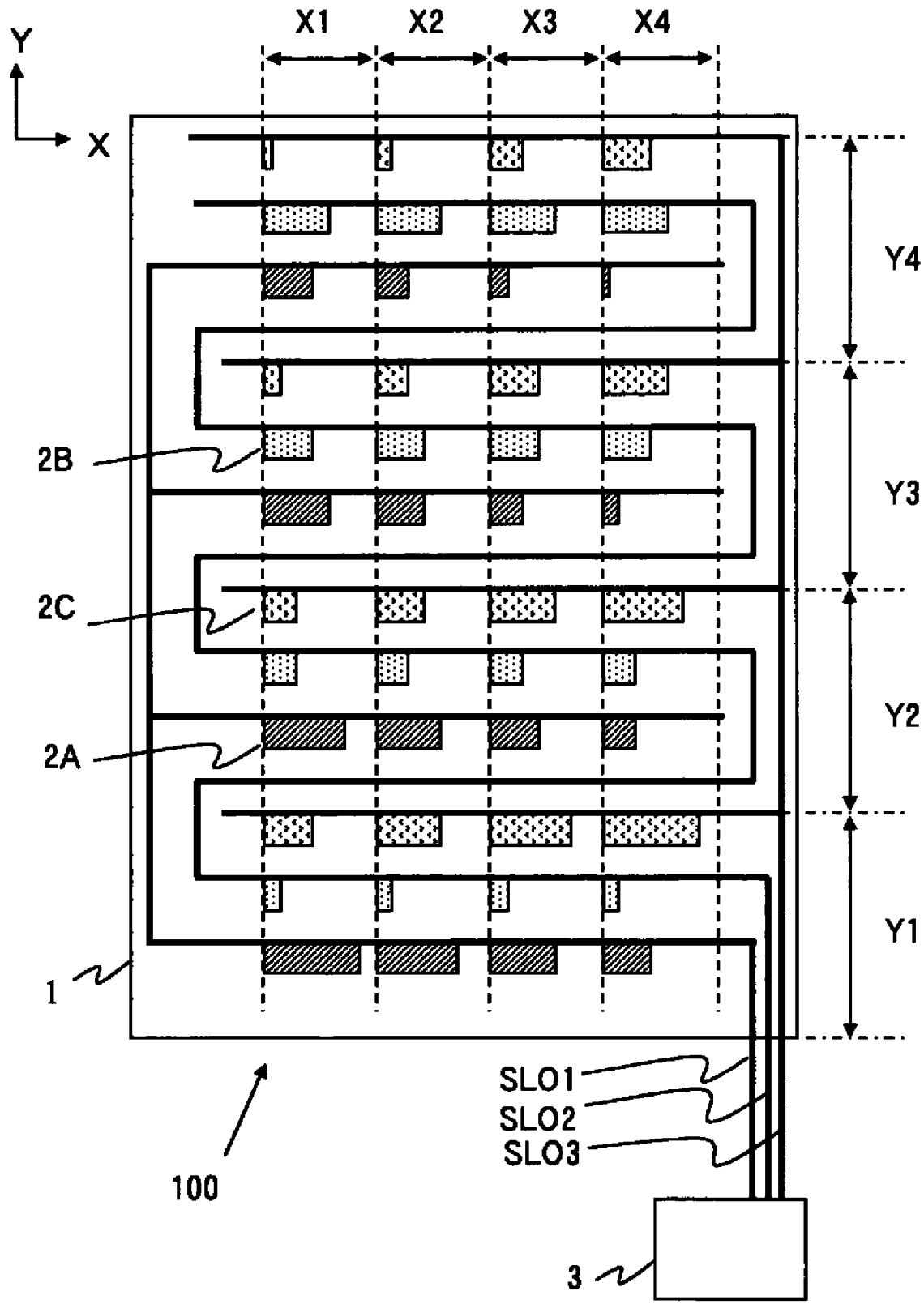
FIG. 1 is a view schematically illustrating the structure of a touch panel according to a first embodiment of the present invention.

FIG. 1 is a view schematically illustrating the structure of a touch panel according to a first embodiment of the present invention. In the touch panel 100 shown in FIG. 1, a transparent conductor film arranged on a glass substrate 1 is patterned to form a plurality of electrode pads 2A, 2B, and 2C arranged in matrix form in a direction X and a direction Y. The electrode pads 2A, 2B, and 2C are in the form of a structure in which external input points (locations touched by the user's finger, touch locations) in the operating plane (touch area, input area) of the touch panel are sensed by capacitive coupling.

The electrode pads 2A, 2B, and 2C, which comprise a transparent conductor film of systematically varying size, are connected to three signal wires SLO1, SLO2, and SLO3, respectively, that extend from a sensing circuit 3. The electrode pads 2A, 2B, and 2C are first, second, and third rows, respectively, which repeat in units of three rows on the matrix. The surface areas of the electrode pads 2A connected to the signal wire SLO1 in each row (direction X) of the touch panel decrease from left to right in FIG. 1, and the surface areas of the electrode pads 2A connected to the signal wire SLO1 in each column (direction Y) decrease from the bottom to the top in FIG. 1.

The shape of the electrode pads 2C connected to the signal wire SLO3 is such that the surface areas connected to the signal wire SLO3 in each row increase from left to right, and the surface areas of the electrode pads 2C connected to the signal wire SLO3 in each of the columns increases from top to bottom. The surface areas of the electrode pads connected to the signal wires SLO1 and SLO3 vary counter to each other in the horizontal direction and in the same way in the vertical direction.

The surface areas of the electrode pads 2B connected to the signal wire SLO2 are constant in each row, and the surface areas decrease from the top to the bottom in each column. That is, the changes in the surface areas of the electrode pads connected to the signal wires SLO1 and SLO3, respectively, are different from each other in the horizontal (X) direction, and the changes in the surface areas of the electrode pads that are connected to the signal wire SLO2 and of the electrode pads connected to the signal wires SLO1 and SLO3, respectively, are different from each other in the vertical (Y) direction. The changes in the surface areas of the electrode pads in each row may also be the opposite of the above.

The signal wires SLO1, SLO2, and SLO3 are also electrically connected to the sensing circuit through a flexible cable or the like, electrical signals are processed in the sensing circuit, and the XY coordinates touched by fingers on the touch panel are sensed. In the structure in the present embodiment, one example comprises sensing areas in the form of a matrix from X1 to X4 in the horizontal (X) direction and from Y1 to Y4 in the vertical (Y) direction. A sensing area includes at least one of the electrode pads connected to the signal wires SLO1, SLO2, and SLO3, respectively.

Figure 2:
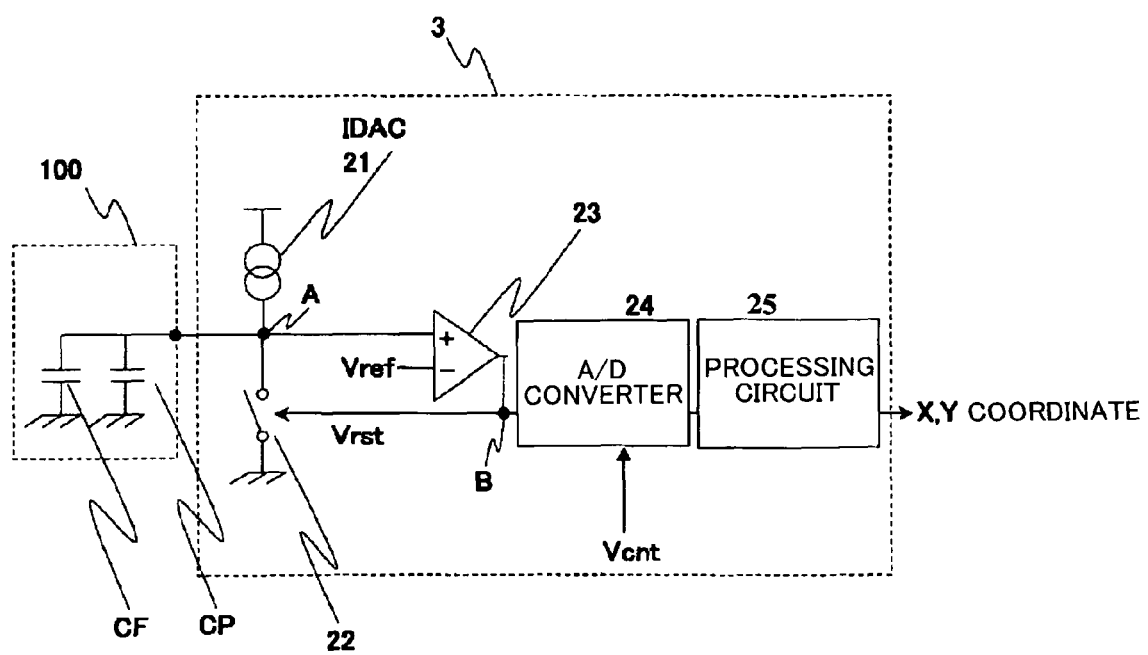
FIG. 2 is a block diagram of the sensing circuit in FIG. 1.

FIG. 2 is a block diagram of the sensing circuit in FIG. 1. In FIG. 1, the three signal wires are connected to the sensing circuit 3, but here only the sensing circuit connected to the signal wire SLO1 is shown. The sensing circuit 3 is connected to a current source (IDAC) 21 and to a reset switch 22 that is grounded at the other end. The connection terminal node A of both is connected to one input terminal of a comparator 23. A standard voltage Vref is connected to the other end of the comparator 23. The output terminal of the comparator 23 is connected to a timer circuit (AD converter) 24, and the timer circuit 24 is connected to a processing circuit 25. The timer circuit 24 has an internal counter circuit, and the duration of the integral value of the comparator 23 is counted by the counter circuit at a count pulse Vcnt for analog-digital (AD) conversion. Although not shown, the other signal wires SLO2 and SLO3 are also separately provided with similar circuits, and the respective digital output values are input to the processing circuit 25. The processing circuit 25 then calculates the XY coordinates based on the respective digital output values from the signal wires SLO1, SLO2, and SLO3 processed by the timer circuit 24.

Figure 3:
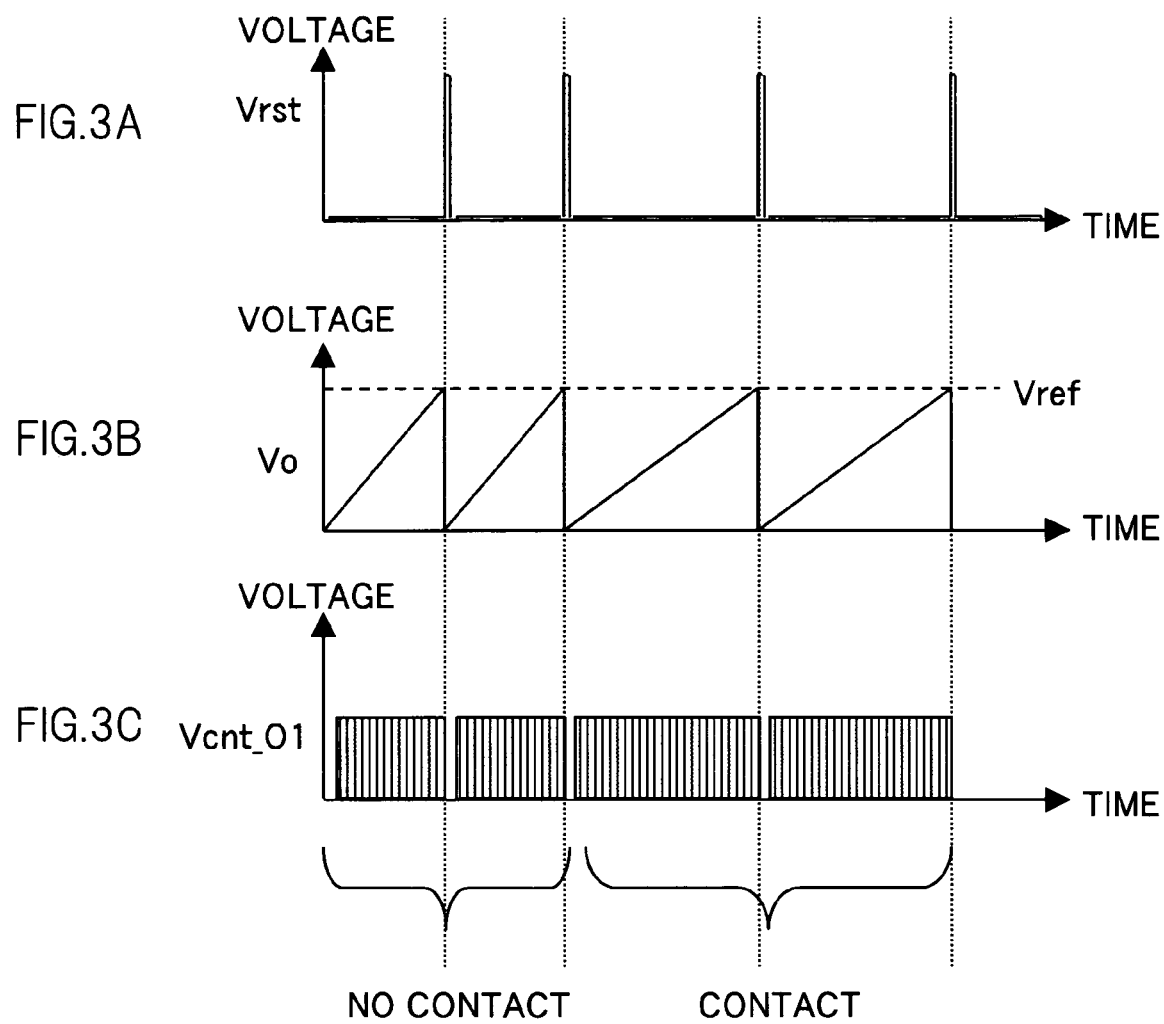
FIG. 3A is a timing chart illustrating the operating sequence of the sensing circuit in FIG. 2.
FIG. 3B is a timing chart illustrating the operating sequence of the sensing circuit in FIG. 2.
FIG. 3C is a timing chart illustrating the operating sequence of the sensing circuit in FIG. 2.

FIGS. 3A through 3C are timing charts illustrating the operating sequence of the sensing circuit in FIG. 2. While the touch panel is not touched by any fingers, the voltage of the node A in FIG. 2 is determined by the time it takes for the current source (IDAC) 21 to be charged to the parasitic capacitance CP of the transparent electrode pads of the touch panel. As for the voltage of the node B in FIG. 2, the voltage integrated by the comparator 23 reaches the standard voltage Vref, whereby the reset signal Vrst in the timer circuit is input to the control electrode of the reset switch 22, the reset switch 22 is turned on, and the voltage of the node A is brought to ground level.

The internal counter circuit of the timer circuit 24 counts the integral time of the node B at a count pulse Vcnt and outputs the output voltage Vcnt_O1. Although not shown in the figure, the corresponding output voltage Vcnt_O3 and Vcnt_O2 from the other signal wires SLO2 and SLO3 are also output from similar timer circuits that have been separately provided. Here, a finger contacts the touch panel, whereby the capacitance CF is loaded in addition to the parasitic capacitance CP. It thus takes longer for the voltage of the node A to reach the standard voltage Vref. This means that the current source (IDAC) 21 takes longer to charge to the capacitance CP and CF, and as a result, the count number of the output voltage Vcnt_O1 of the timer circuit 24 is greater than during the absence of contact. Similarly, the count numbers of the output voltage Vcnt_O2 and Vcnt_O3 are also greater than during the absence of contact. The sensing circuit 3 in the present embodiment determines whether or not the touch panel has been touched by a finger based on the differences in the pulse count number from the timer circuit. The XY coordinates are also processed based on the count numbers for the output voltages Vcnt_O1, Vcnt_O3, and Vcnt_O2 from the signal wires SLO1, SLO2, and SLO3.

Figure 4:
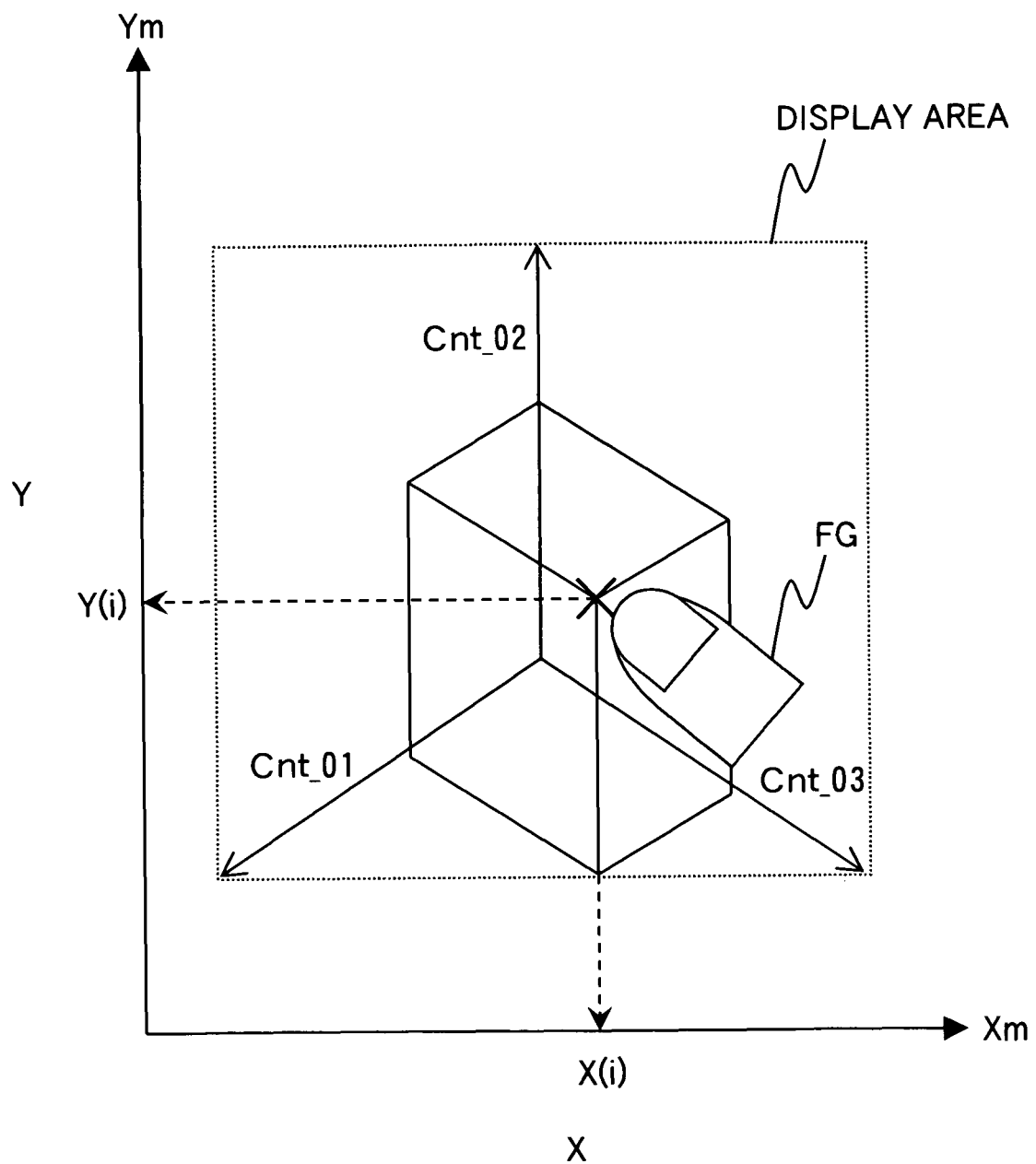
FIG. 4 is a view illustrating a process for sensing coordinates in the touch panel according to the first embodiment.

FIG. 4 is a view illustrating a process for sensing coordinates in the touch panel according to the first embodiment. FIG. 4 is a conceptual view in which the count numbers of the timer output levels Vcnt_O1, Vcnt_O2, and Vcnt_O3 are mapped in two-dimensional coordinates. The shape of the electrode pads connected to the signal wires SLO1, SLO2, and SLO3 are made in the form shown in FIG. 1, so that the XY coordinates are computed by the computing formulas shown in Formula (1) and Formula (2). Here, increases in the pulse count number for Vcnt_O1, Vcnt_O2, and Vcnt_O3 when a finger is in contact are Cnt_O1, Cnt_O2, and Cnt_O3, respectively.

$$X(i) = \frac{Xm}{2} + \left\{ \frac{(Cnt\_03 - Cnt\_01)}{(Cnt\_01 + Cnt\_02 + Cnt\_03)} \right\} \times Xm \quad \text{Formula (1)}$$

$$Y(i) = Ym + \left\{ \frac{(Cnt\_02 - (Cnt\_01 + Cnt\_03))}{(Cnt\_01 + Cnt\_02 + Cnt\_03)} \right\} \times Ym \quad \text{Formula (2)}$$

Here, X(i) and Y(i) are the calculated values of XY coordinates, and Xm and Ym are the maximum sensing division numbers of the touch panel.

In Formula (1), the difference in the increase of the count number for the output voltage Vcnt_O1 and Vcnt_O3 of the timer circuit is normalized and determined by the increase in the count number of the output voltage Vcnt_O1, Vcnt_O2, and Vcnt_O3 of the signal wires SLO1, SLO2, and SLO3. In Formula (2), the difference in the sum of the increase in the count number of the output voltage Vcnt_O1, Vcnt_O3, and Vcnt_O2 of the signal wire SLO2, as well as the timer circuits for the signal wires SLO1 and SLO3, is normalized by the increase in the counter number of the output voltage Vcnt_O1, Vcnt_O2, and Vcnt_O3 of the signal wires SLO1, SLO2, and SLO3.

The sensing areas of the touch panel in the first embodiment are four in the horizontal (X) direction by four in the vertical (Y) direction, and Formulas (1) and (2) can be used to bring about sensing division numbers equal to or greater than the sensing areas. As an example, the left center (X1, Y2) in the touch panel is touched by a finger FG. At that time, the increase in the timer circuit output value of each signal wire at a sensing resolution Xm=320 and Ym=720 (corresponding to the display resolution QVGA of a standard liquid crystal display device in a mobile display) will be signal wire SLO1=16,000 (count), signal wire SLO2=4,500 (count), and signal wire SLO3=5,000 (count). Calculating this by Formulas (1) and (2) gives coordinate values of X(i)=22 and Y(i)=254.

Figure 5:
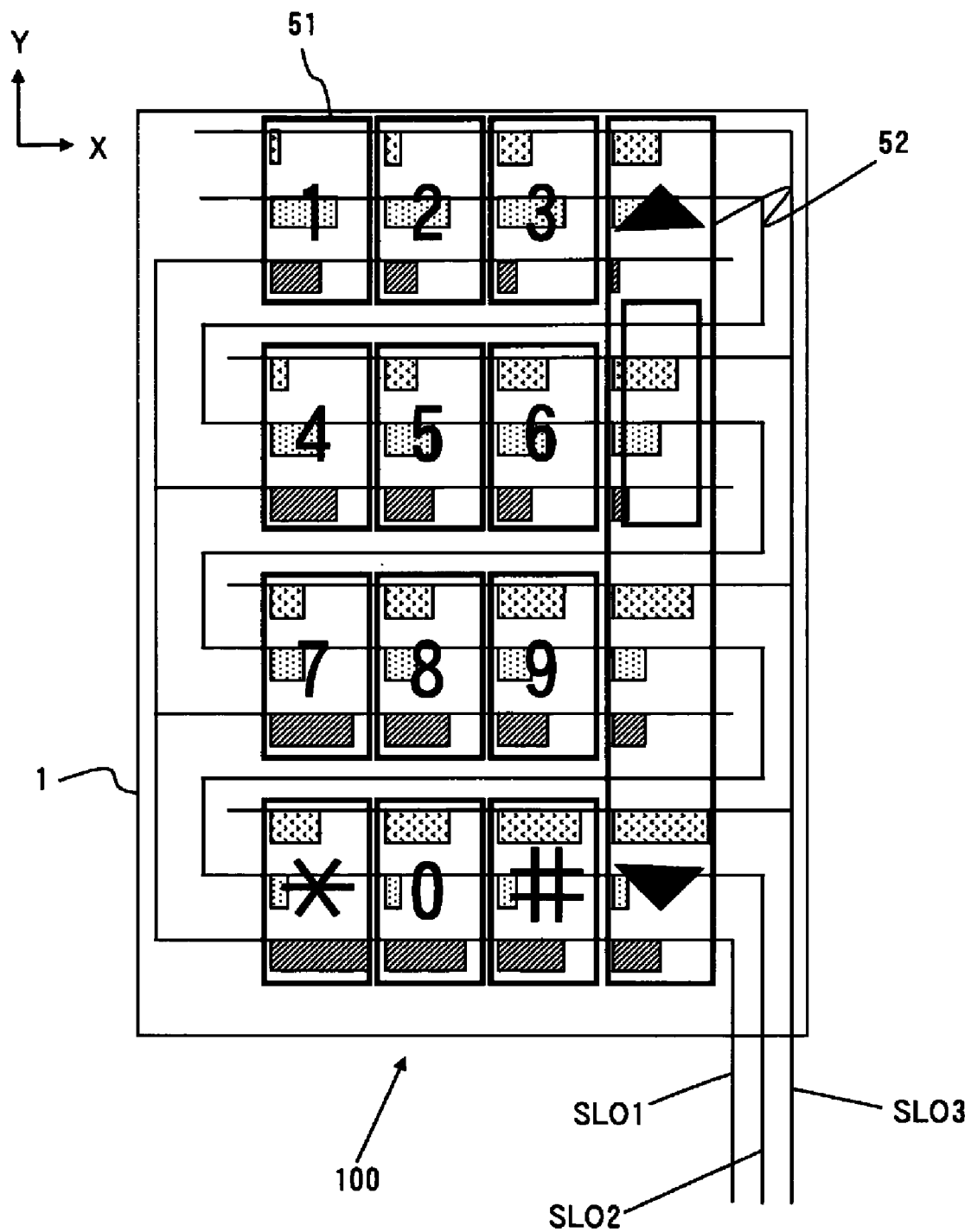
FIG. 5 is a view illustrating an example of a graphical user interface (GUI) in the first embodiment.

FIG. 5 is a view illustrating an example of a graphical user interface (GUI) in the first embodiment. As an example, one touch button 51 per sensing area in the touch panel and slider 52 (scroll bar) are displayed. The touch panel sensing resolution is set in accordance with the resolution of a liquid crystal display, to allow the coordinates of touch buttons of various shapes to be sensed.

The effects of the first embodiment described above are discussed below. First, the transparent conductor film is a single layer, and relatively large electrodes can be made, thus minimizing the loss of image display light transmittance from liquid crystal display panels. Second, drive circuits and touch panel connections can be easier to produce. Third, the present invention can be constructed with three connection terminals, making it possible to avoid increasing sensing circuits and the number of terminals and to help lower costs and conserve energy. Fourth, no wire resistance is used, and touch locations are sensed on the basis of the proportions of charge level, thereby avoiding the effects of irregular resistance or the like and improving the accuracy of coordinate sensing.

Second Embodiment

Figure 6:
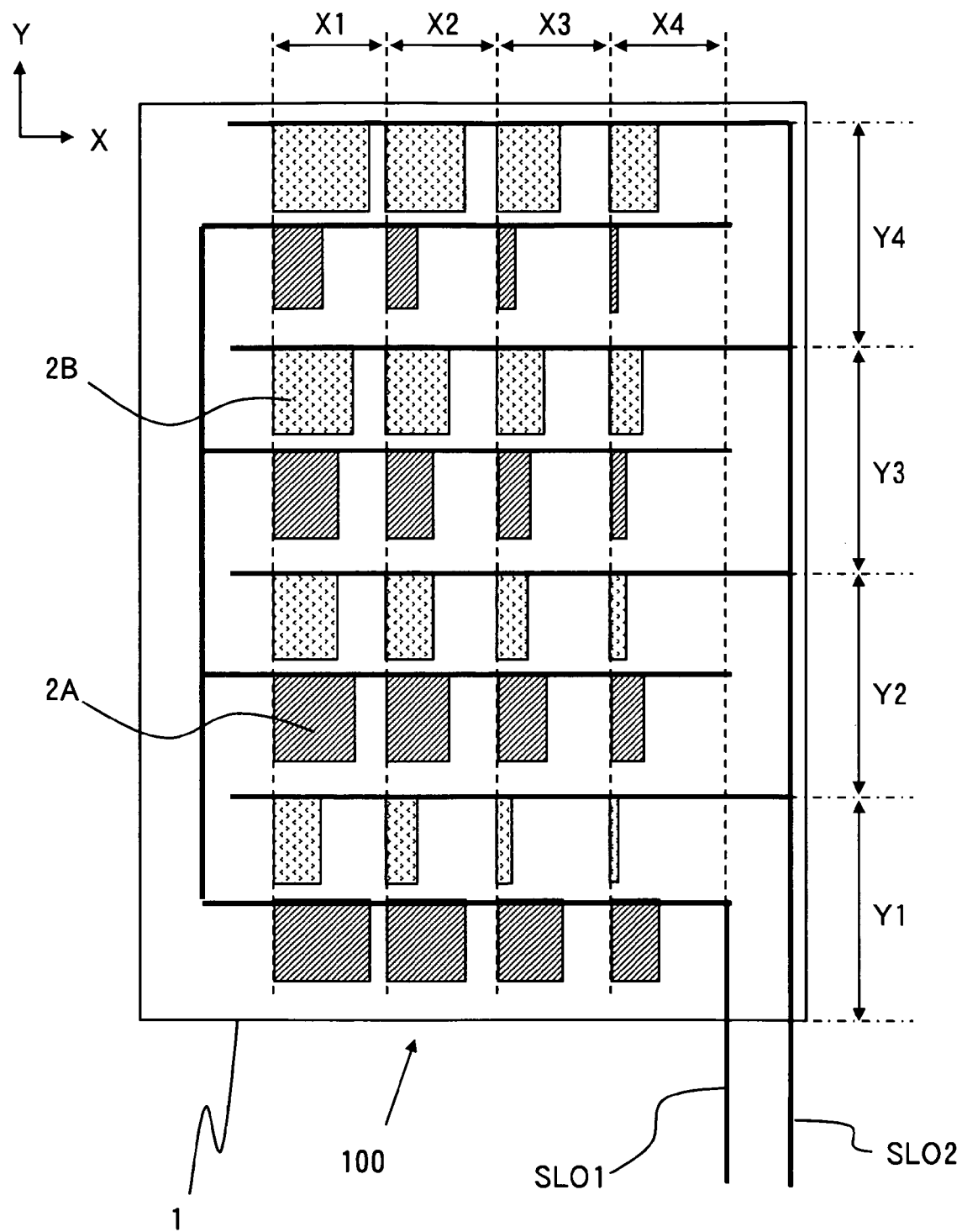
FIG. 6 is a view schematically illustrating the structure of a touch panel according to a second embodiment of the present invention.

A second embodiment of the present invention is described next. FIG. 6 is a view schematically illustrating the structure of a touch panel according to a second embodiment of the present invention. In FIG. 6, two signal wires SLO1 and SLO2 are provided in the structure of FIG. 1. The same effects as in the first embodiment can be obtained using just two signal wires. The specific structure is described below.

The surface areas of the electrode pads 2A connected to the signal wire SLO1 decrease from left to right (direction X) in FIG. 6 in each row, and the surface areas decrease from bottom to top in FIG. 6 in each column. The surface areas of the electrode pads 2B connected to the signal wire SLO2 decrease from left to right in FIG. 6 in each row (X direction) and decrease from top to bottom in FIG. 6 in each column (Y direction). The directions in which the surface areas change may be the reverse of each other. That is, the surface areas of the electrode pads connected to the signal wires SLO1 and SLO2, respectively, may change in the same way in the horizontal (X) direction and the opposite of each other in the vertical (Y) direction. The structure is otherwise the same as in the first embodiment, and will therefore not be further elaborated. The electrode pads 2A and 2B are in first and second rows that repeat in two row units on the matrix.

In the present embodiment, there are two signal wires, thus making connections to the sensing circuit simpler, and the structure of the sensing circuit is not increased, thus making it possible to conserve energy consumption in the touch panel and reduce the sensing time.

Third Embodiment

Figure 7:
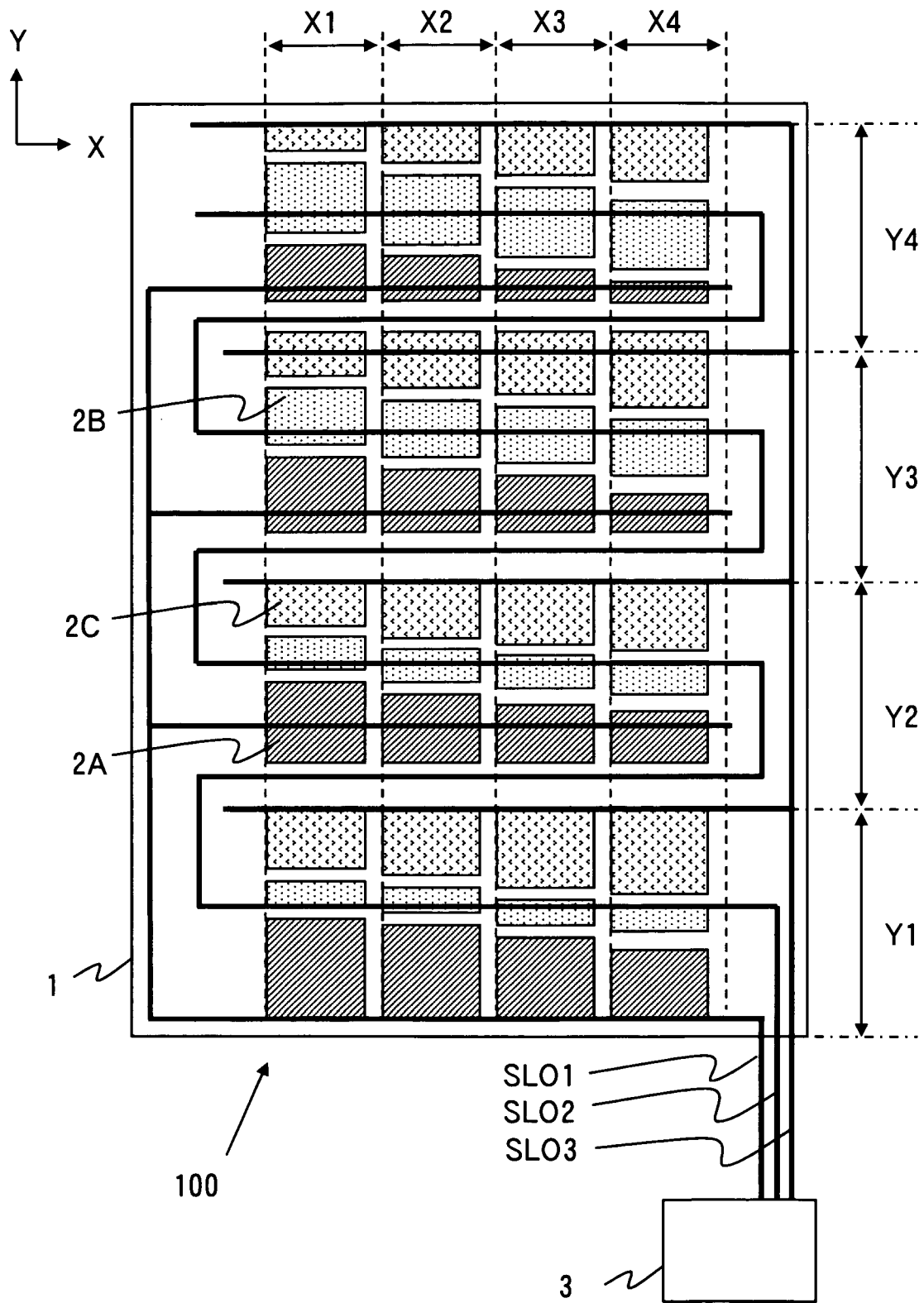
FIG. 7 is a view schematically illustrating the structure of a touch panel according to a third embodiment of the present invention.

A third embodiment of the present invention is described next. FIG. 7 is a view schematically illustrating the structure of a touch panel according to a third embodiment. In FIG. 7, the total number of electrode pads can be increased, or the surface area per electrode pad can be increased, by bringing the electrode pads connected to the signal wire SLO1, SLO2, and SLO3 closer together in the structure of FIG. 1 illustrating the first embodiment. The structure is otherwise the same as in the first embodiment, and will therefore not be further elaborated.

The proportion that the sensing area occupies in the area of the touch panel is thereby made greater in the third embodiment than in the structure of the first embodiment, and results in greater sensing sensitivity. The total number of electrode pads is also increased, whereby the accuracy of coordinate sensing is enhanced. That is, the structure in the present embodiment results in greater latitude regarding the use of the touch panel.

Fourth Embodiment

Figure 8:
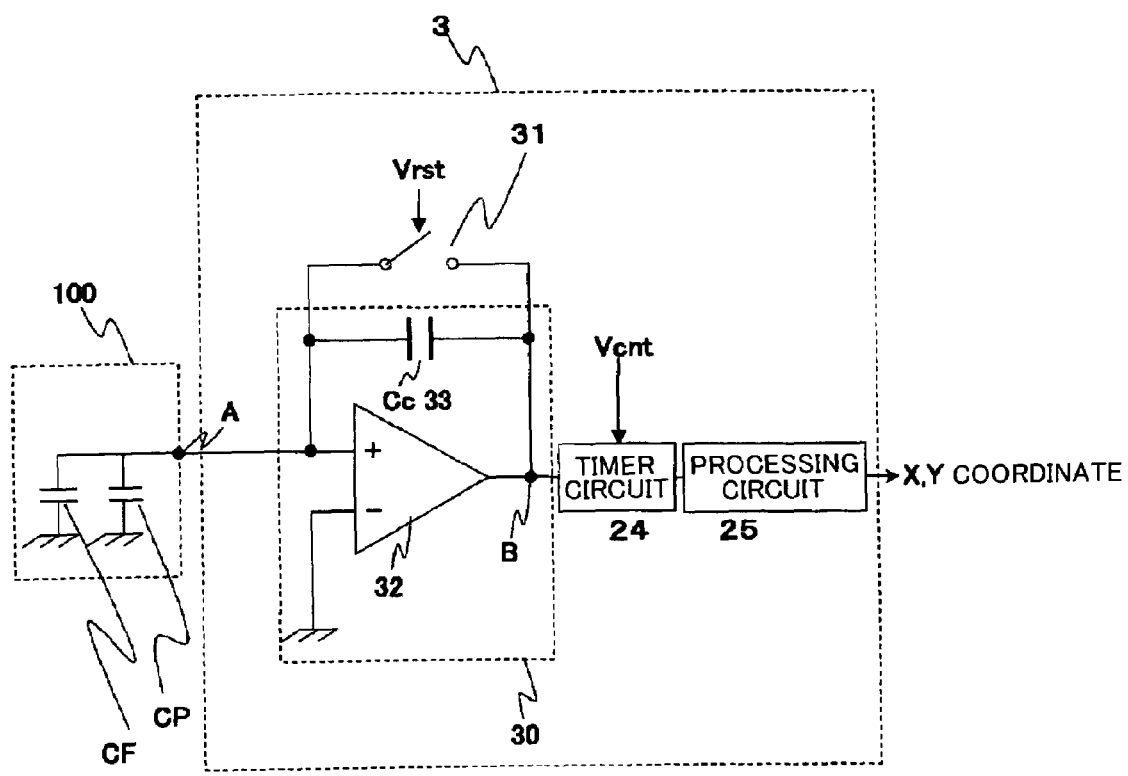
FIG. 8 is a view schematically illustrating the structure of a touch panel according to a fourth embodiment of the present invention.

A fourth embodiment of the present invention will be described with reference to FIG. 8. FIG. 8 is a view schematically illustrating the structure of a touch panel according to a fourth embodiment of the present invention. FIG. 8 shows a capacitance and a sensing circuit for a signal wire. The sensing circuit 3 in the present embodiment comprises an integration circuit 30 in which a capacitance (Cc) and a reset switch 31 are connected in parallel to the input/output terminal of an op-amp 32, and furthermore comprises a timer circuit 24 and a processing circuit 25. The integrated capacitance (Cc) is connected to the input/output terminals of the op-amp 32, and the charge produced by the finger capacitance CF and parasitic capacitance of the touch panel 100 connected to the node A is stored in the integrated capacitance (Cc). The output voltage of the node B is determined by the proportion between the integrated capacitance (Cc) 33 and (CP+CF). Therefore, it will be evident that the integrated capacitance (Cc) 33 is a parameter that determines sensitivity. The reset switch is also connected to the op-amp 32 input/output terminals in parallel with the integrated capacitance (Cc) 33.

A clock signal (counter pulse) Vrst is input to the control terminal of the reset switch 31 at a certain cycle, thereby allowing the sensing time to be controlled. The sensing circuit 3 sensitivity and sensing time are therefore determined by the cycle of the reset switch 31 and the integrated capacitance (Cc) 33. The present embodiment employs a time-converting timer circuit as an AD converter, but a circuit in which analog voltage is converted to a digital value, such as an AD converter, may also be adopted in the same manner as the sensing circuit in FIG. 2 illustrating the first embodiment, to adjust the intended application to be implemented. The structure is otherwise the same as the sensing circuit structure in FIG. 2, and will therefore not be further elaborated. The operating sequence of the sensing circuit 3 is also the same as in FIG. 3.

Figure 9:
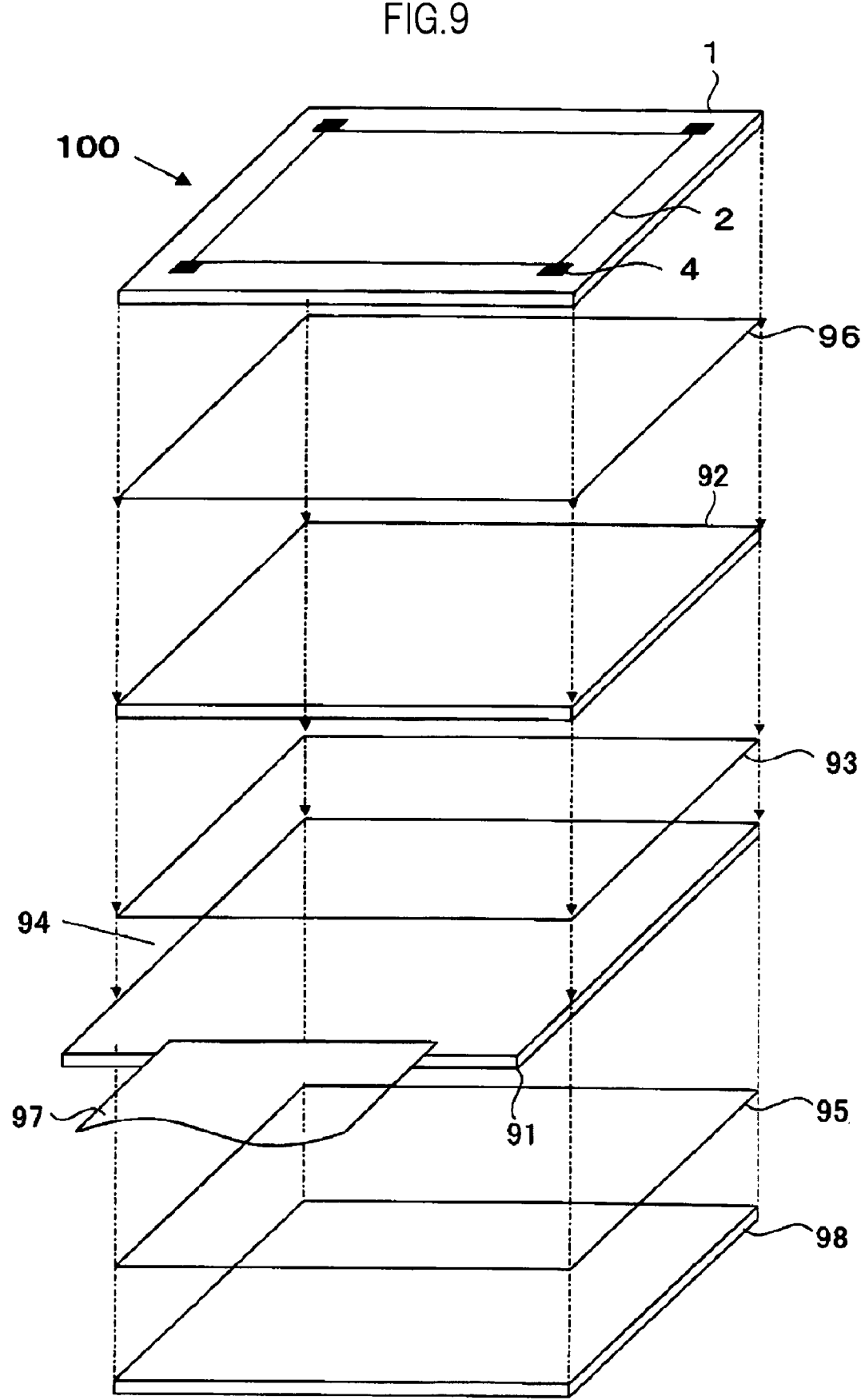
FIG. 9 is a perspective development elevation illustrating an example of the structure of a liquid crystal display device according to an embodiment of the present invention.

FIG. 9 is a perspective development elevation illustrating an example of the structure of a liquid crystal display device according to an embodiment of the present invention. In this screen-input image display device, the touch panel is superposed on the display screen of a TN type (longitudinal field type) of liquid crystal display panel. The TN liquid crystal display panel comprises a thin film transistor substrate (TFT substrate) 91 provided with a drive circuit and a display area in which a plurality of pixels that comprise thin film transistor circuits are arranged two-dimensionally; a liquid crystal layer 94 sealed between the substrate and a facing substrate 92 on the inner surface of which is formed the counter electrode 93 of the pixel electrode; and a lower polarization plate 95 and upper polarization plate 96. One side of the TFT substrate 91 is provided with a flexible printed board 97 connected to the host side. A backlight 98 is located on the rear surface of the TFT substrate 91.

A touch panel 100 is superposed on top of the upper polarization plate 96 (observer side, user side). The touch panel 100 is obtained by forming a transparent conductor film 2 for sensing locations on a glass substrate 1, which is a transparent substrate. The signal wires and transparent electrode pads as described in the embodiments thus far are patterned on the transparent conductor film 2. Connection pads 4 for connecting the signal wires to the sensing circuit are formed in the four corners. Three or two of the connection pads 4 in the four corners are connected to the signal wires in the embodiments thus far. The transparent conductor film 2 for sensing locations may be formed on either the front side (observer side, user side) or reverse side (side in contact with the upper polarization plate 96) of the glass substrate 1, but when formed on the front side, the top is covered by a protective film such as a transparent plastic sheet.

Figure 10:
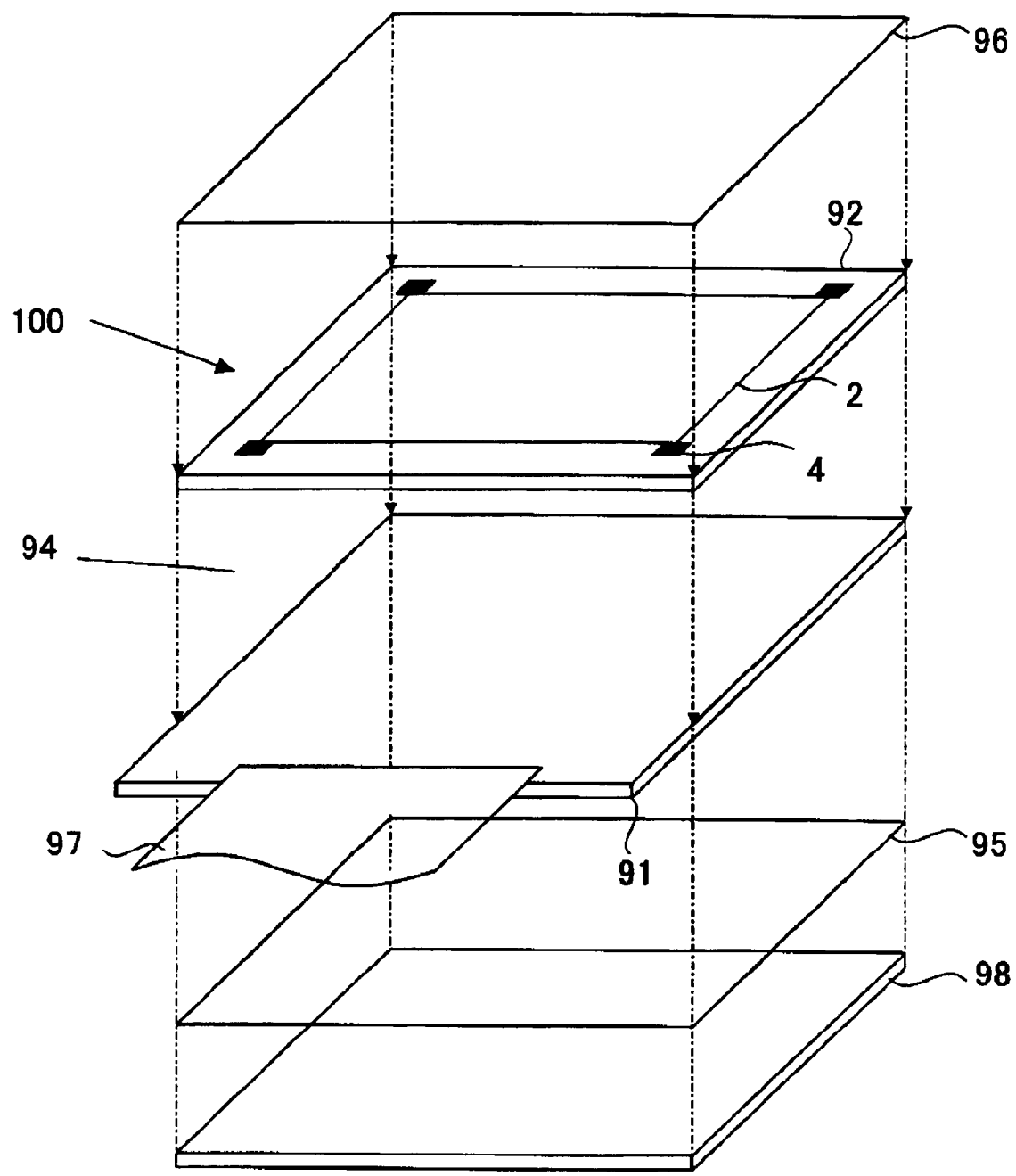
FIG. 10 is a perspective development elevation illustrating an example of the structure of another liquid crystal display device according to an embodiment of the present invention.

FIG. 10 is a perspective development elevation illustrating an example of the structure of another liquid crystal display device according to an embodiment of the present invention. In this screen-input image display device, the touch panel is formed on the display screen of an IPS type (in plane switching type) of liquid crystal display panel. The touch panel is formed on the facing substrate that forms the display screen of the IPS type of liquid crystal display panel. The IPS liquid crystal display panel comprises a thin film transistor substrate (TFT substrate) 91 provided with a drive circuit and a display area in which a plurality of pixels that comprise thin film transistor circuits are arranged two-dimensionally along with counter electrodes; a liquid crystal layer 94 sealed between the substrate and a facing substrate 92; and a lower polarization plate 95 and upper polarization plate 96. One side of the TFT substrate 91 is provided with a flexible printed board 97 connected to the host side. A backlight 98 is located on the rear surface of the liquid crystal display panel.

The touch panel 100 is obtained by forming a transparent conductor film 2 for sensing locations on the facing substrate 92. The signal wires and transparent electrode pads as described in the embodiments thus far are patterned on the transparent conductor film 2. Connection pads 4 for connecting the signal wires to the sensing circuit are formed in the four corners. Three or two of the connection pads 4 in the four corners are connected to the signal wires in the embodiments thus far. The transparent conductor film 2 for sensing locations may be formed on either the front side (polarization plate underlayer) or reverse side (liquid crystal 94 side) of the facing substrate 92.

Figure 11:
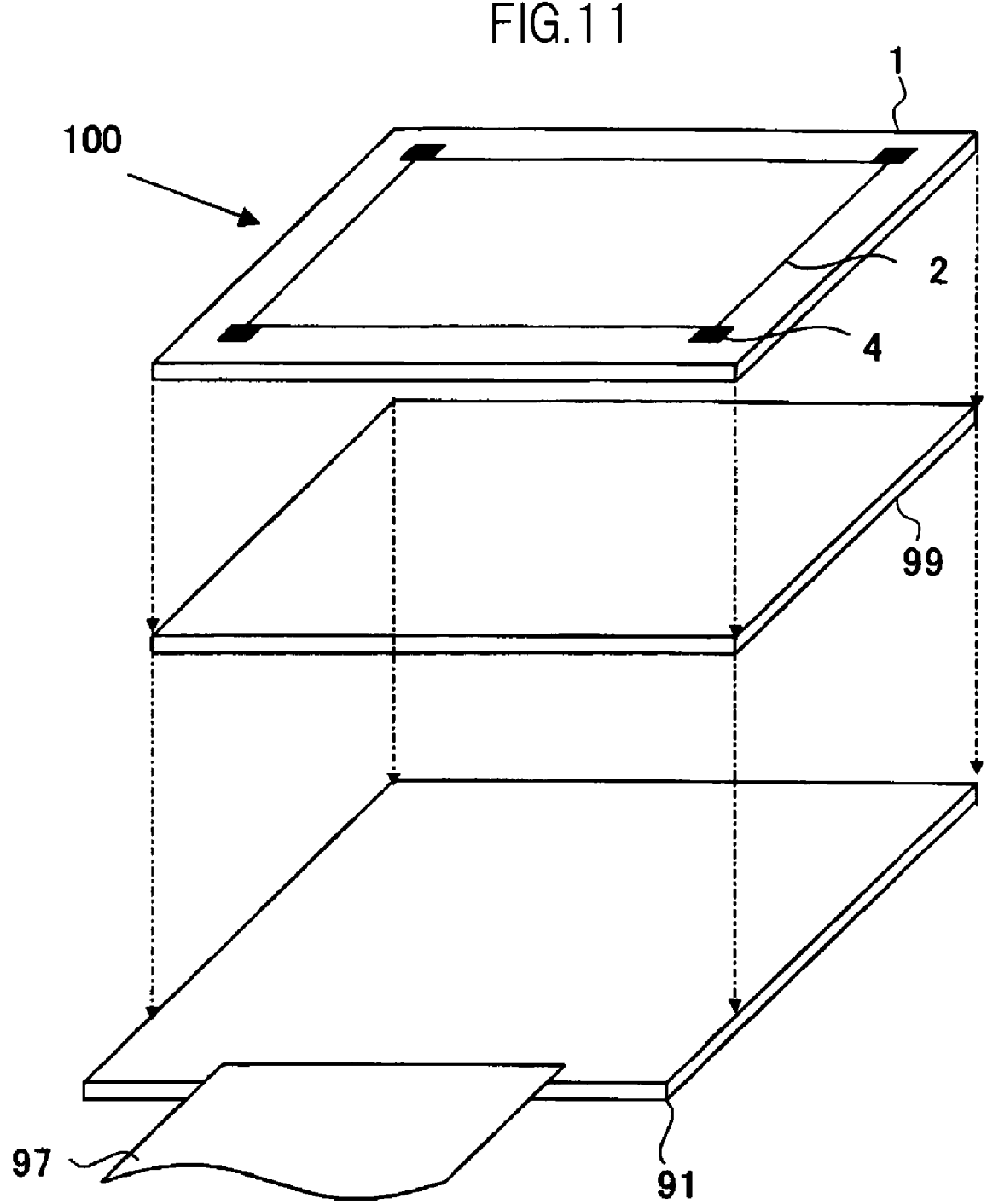
FIG. 11 is a perspective development elevation illustrating an example of the structure of an organic EL display device according to an embodiment of the present invention.

FIG. 11 is a perspective development elevation illustrating the structure of an organic EL display device according to an embodiment of the present invention. In this screen-input image display device, the touch panel is superposed on the sealed substrate side of the organic EL display device. The organic EL display panel comprises a thin film transistor substrate (TFT substrate) 91 provided with a drive circuit and a display area in which a plurality of pixels that comprise thin film transistor circuits and organic EL emission layers are arranged two-dimensionally; and a sealed substrate 99. One side of the TFT substrate 91 is provided with a flexible printed board 97 connected to the host side.

The touch panel 100 is obtained by forming a transparent conductor film 2 for sensing locations on a glass substrate 1, which is a transparent substrate. The signal wires and transparent electrode pads as described in the embodiments thus far are patterned on the transparent conductor film 2. Connection pads 4 for connecting the signal wires to the sensing circuit are formed in the four corners. Three or two of the connection pads 4 in the four corners are connected to the signal wires in the embodiments thus far. The transparent conductor film 2 for sensing locations may be formed on either the front side (observer side, user side) or reverse side (side in contact with the sealed plate 99) of the glass substrate 1. When formed on the front side, the top is covered by a protective film such as a transparent plastic sheet. Although not shown, electrode pads may be formed directly on either the surface or reverse side of the sealed substrate 99.

Figure 12:
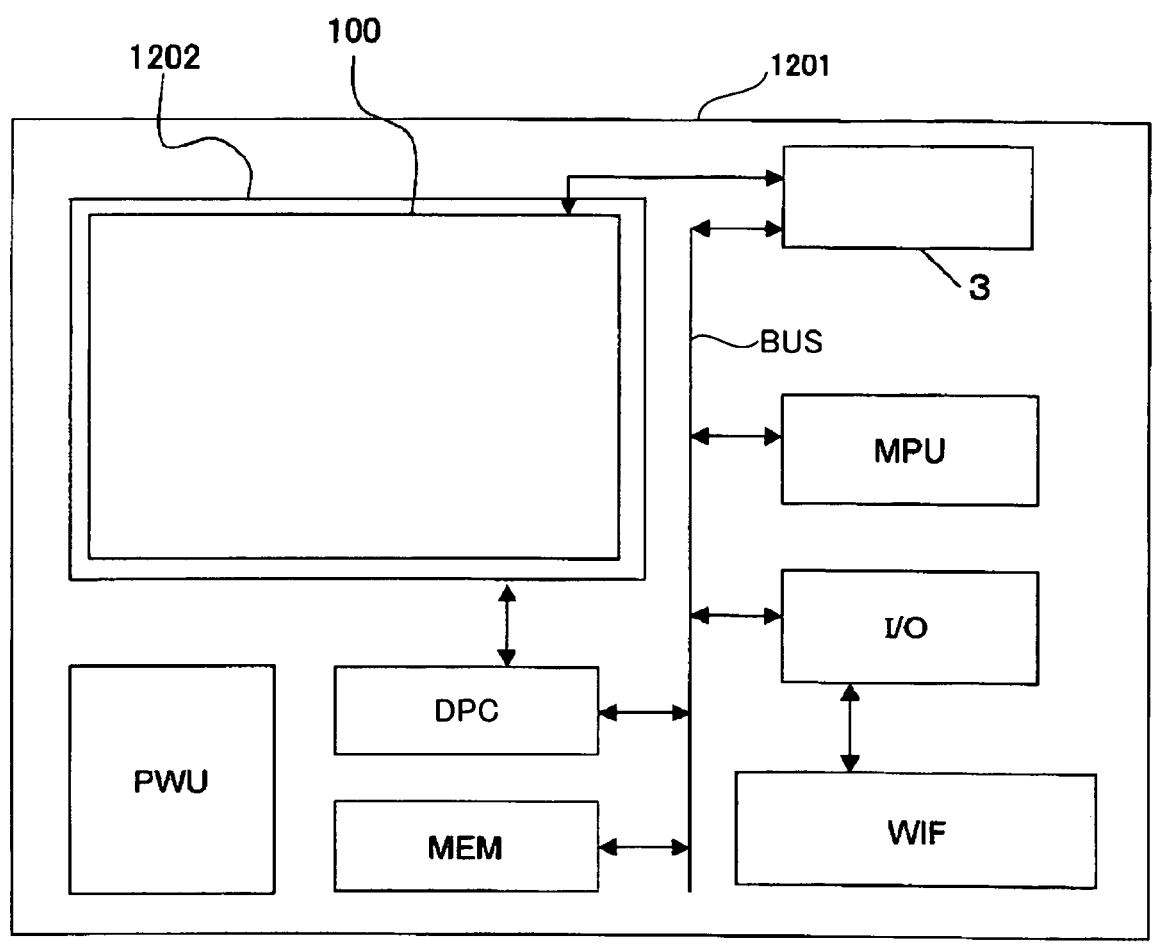
FIG. 12 is a view illustrating the system structure and operation of a screen-input image display device according to an embodiment of the present invention.

FIG. 12 is a view illustrating the system structure and operation of a screen-input image display device according to an embodiment of the present invention. A wireless interface circuit WIF takes in external image data compressed according to commands based on the user's operations. The image data is sent to a microprocessor MPU and flame memory MEM through an input/output circuit I/O. The microprocessor MPU receives commands based on the user's operations, and drives the screen-input image display device 1201 as a whole as needed to decode the compressed image data, process signals, or display data.

The image data processed as a signal can be temporarily stored in the frame memory MEM. Here, when the microprocessor MPU outputs a display command, image data is input from the frame memory MEM through the display panel controller DPC to the liquid crystal display panel 1202 as commanded. The liquid crystal display panel 1202 displays the input image data in real time. At that time, the display panel controller DPC outputs certain timing pulses which are necessary for displaying images. A voltage-generating circuit PWU generates various types of voltage which are necessary for the screen-input type of image display unit 1201.

When the microprocessor MPU outputs touch panel input commands based on the operations of the user, the display panel controller DPC drives the sensing circuit 3 of the touch panel 100 as commanded, and the sensed output of the location coordinates touched by the user on the touch panel 100 is output through a data bus BUS to the microprocessor MPU. The microprocessor MPU executes new designated operations in accordance with the output data.

Figure 13:
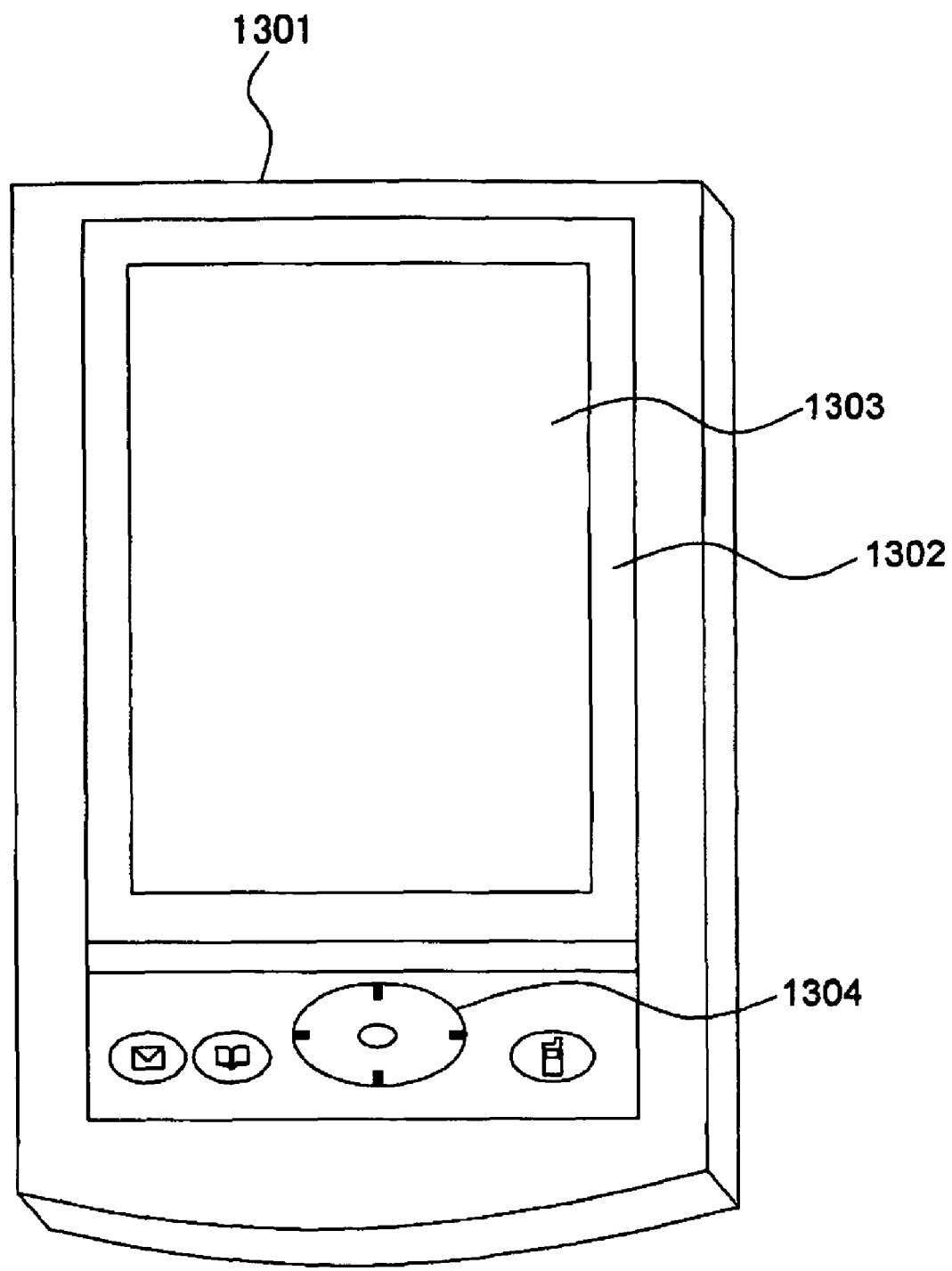
FIG. 13 is a view illustrating a mobile electronic device equipped with screen-input image display device according to an embodiment of the present invention.
Figure 14:
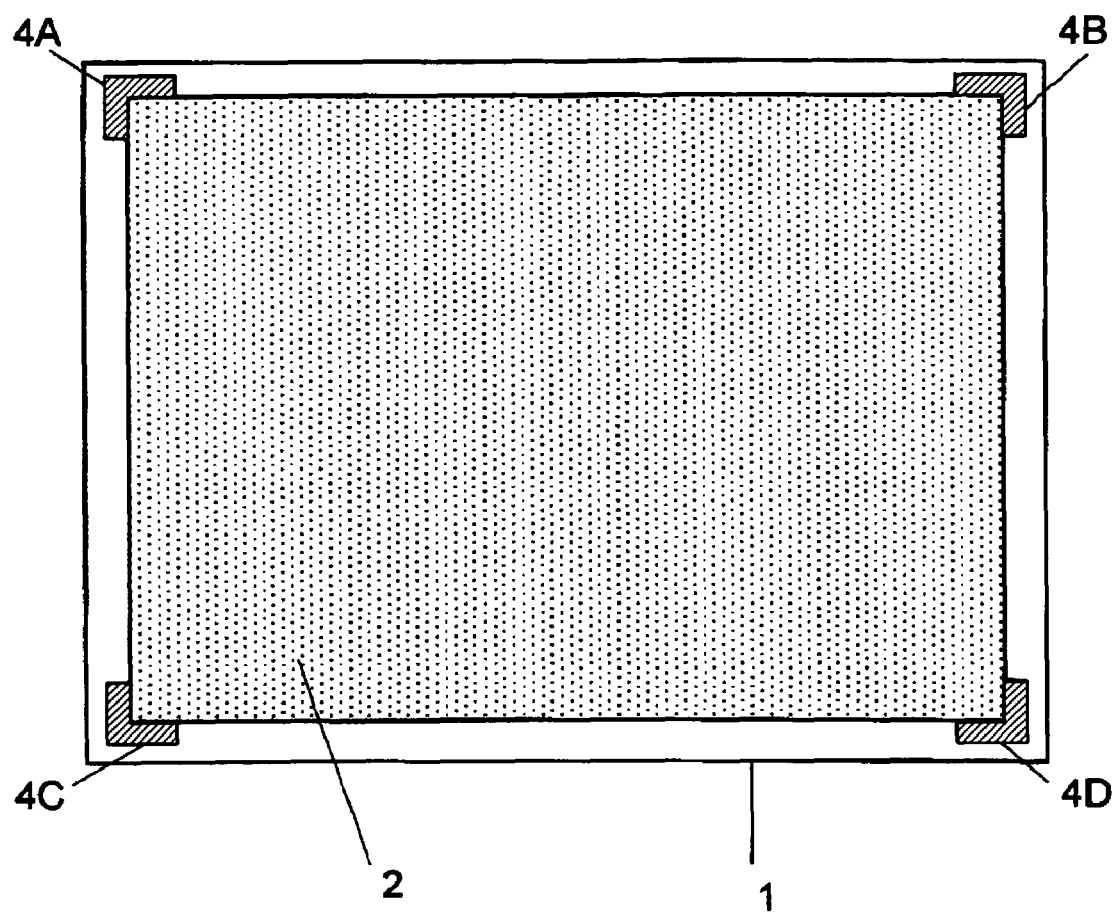
FIG. 14 is a schematic view illustrating the structure of a touch panel used in a system for sensing changes in resistance.
Figure 15:
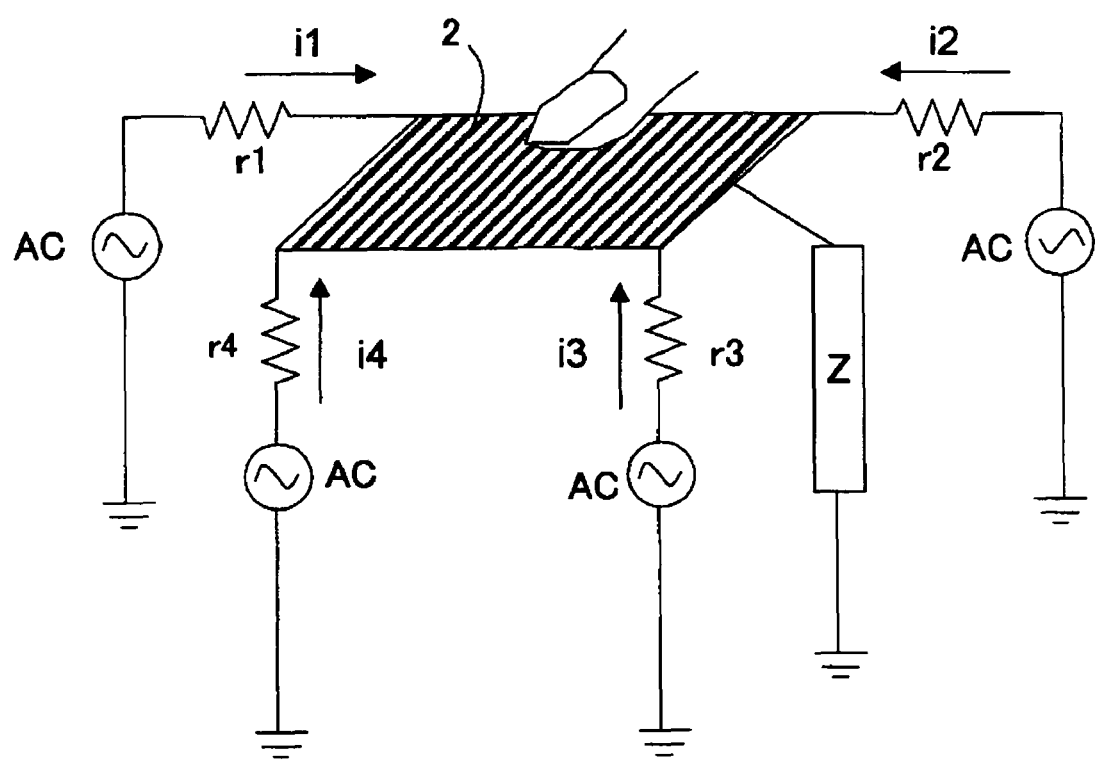
FIG. 15 is a conceptual view illustrating the method for sensing touch locations in the touch panel illustrated in FIG. 14.
Figure 16:
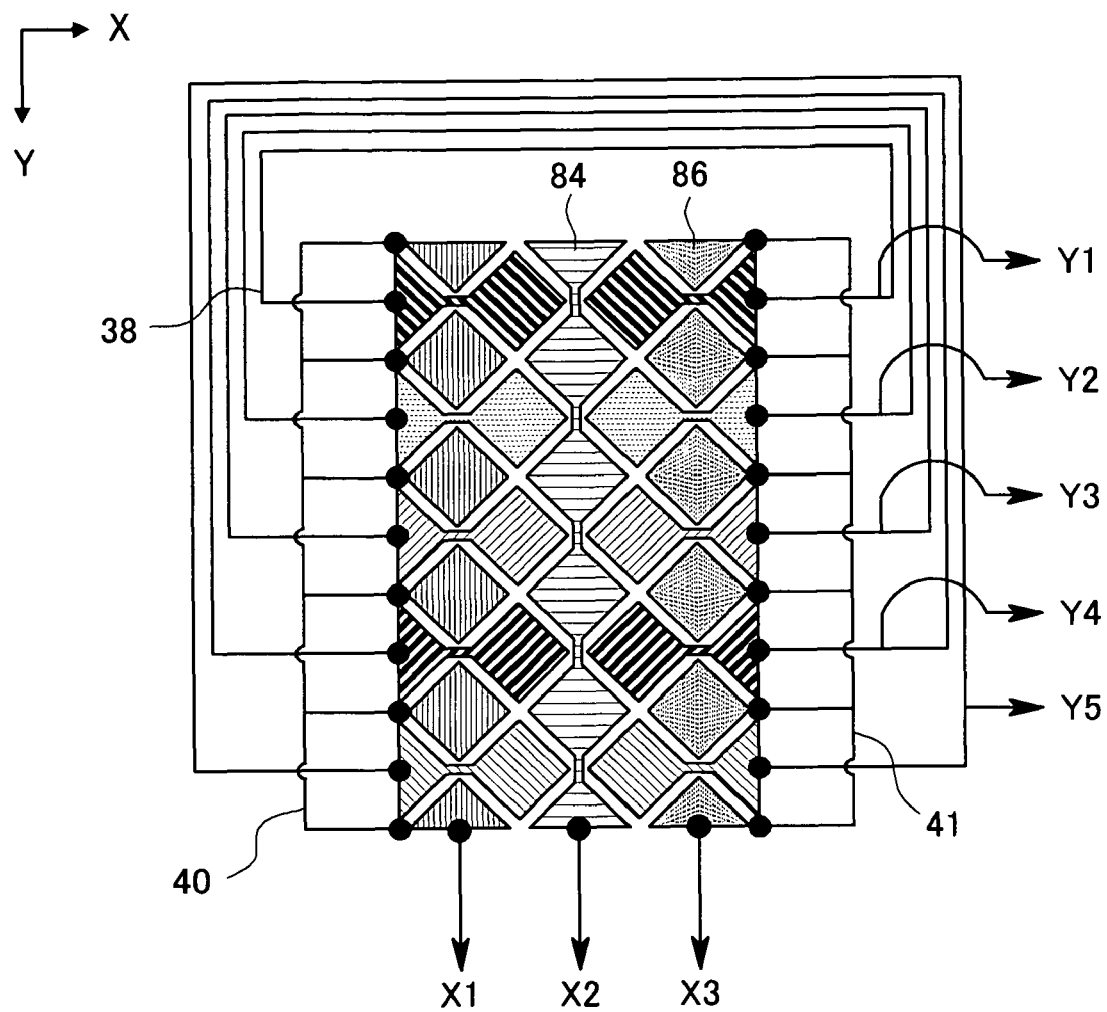
FIG. 16 is a conceptual view illustrating the structure of a touch panel used in a system for sensing changes in capacitance.

FIG. 13 is a view illustrating a mobile electronic device equipped with screen-input image display device according to an embodiment of the present invention. The mobile electronic device 1301 is equipped with a screen-input image display device 1302 according to an embodiment of the present invention, and an operating unit that includes a cross-shaped key 1304. The screen-input image-display device 1302 according to an embodiment of the present invention is mounted to allow the user of the mobile electronic device 1301 to run a designated process by using fingers to touch display components such as icons displayed on the display screen 1303.

While there have been described what are at present considered to be certain embodiments of the present invention, it will be understood that various modifications may be made thereto, and it is intended that the appended claims cover all such modifications as fall within the true spirit and scope of the present invention.

What is claimed is:

1. A screen-input image display device, comprising:
   a touch panel for outputting signals of touched locations of a finger or the like of a user in contact with a display panel screen, the panel being superimposed via touch areas on the screen; and
   a sensing circuit for sensing coordinates of the touched locations based on the output of the touch panel, wherein the touch panel has a transparent conductor film which is single layer on a transparent substrate, the transparent conductor film being patterned into numerous electrode pads arranged in rows and columns of a two-dimensional matrix, surface areas of the electrode pads vary depending on the location of the touch area, and coordinates of the touch locations are sensed based on a proportion of charge signals of the touch locations due to differences in the surface areas of the electrode pads, wherein:

the electrode pads arranged in a row direction and a column direction of the matrix of the touch panel comprise three groups that are repeating every three rows parallel in the row direction, and, viewing the matrix planarly, surface areas of a first row of electrode pads corresponding to one of the three groups decrease from the left to the right in the row direction and decrease from the bottom to the top in the column direction;

surface areas of a second row of electrode pads corresponding to another one of the three groups are constant going laterally in the column direction and decrease from the top to the bottom of the rows; and surface areas of a third row of electrode pads corresponding to another one of the three groups increase from the left to the right in the column direction and increase from the top to the bottom in the row direction.

2. The screen-input image display device of claim 1, the sensing circuit comprising:

a comparator in which one input is an output of a current source for providing current to each of groups of the electrode pad, and the other input is a standard voltage;

a timer circuit for counting output magnitude of the comparator as a number of pulses; and a computing circuit for computing coordinate data of the touch locations based on output of the timer circuit.

3. A screen-input image display device, comprising:

a touch panel for outputting signals of touched locations of a finger or the like of a user in contact with a display panel screen, the panel being superimposed via touch areas on the screen; and a sensing circuit for sensing coordinates of the touched locations based on the output of the touch panel, wherein the touch panel has a transparent conductor film which is single layer on a transparent substrate, the transparent conductor film being patterned into numerous electrode pads arranged in rows and columns of a two-dimensional matrix, surface areas of the electrode pads vary depending on the location of the touch area, and coordinates of the touch locations are sensed based on a proportion of charge signals of the touch locations due to differences in the surface areas of the electrode pads, wherein:

the electrode pads arranged in a row direction and a column direction of the matrix of the touch panel comprise two groups that are repeating every two columns parallel in the row direction, and, viewing the matrix planarly, surface areas of a first row of electrode pads corresponding to one of the two groups decrease from the left to the right in the row direction and decrease from the bottom to the top in the column direction; and surface areas of a second row of electrode pads corresponding to the other of the two groups decrease from the left to the right in the row direction and decrease from the top to the bottom in the column direction.

4. The screen-input image display device of claim 3, the sensing circuit comprising:

a comparator in which one input is an output of a current source for providing current to each of groups of the electrode pad, and the other input is a standard voltage;

a timer circuit for counting output magnitude of the comparator as a number of pulses; and a computing circuit for computing coordinate data of the touch locations based on output of the timer circuit.

5. A screen-input image display device, comprising:

a touch panel for outputting signals of touched locations of a finger or the like of a user in contact with a display panel screen, the panel being superimposed via touch areas on the screen; and a sensing circuit for sensing coordinates of the touched locations based on the output of the touch panel, wherein the touch panel has a transparent conductor film which is single layer on a transparent substrate, the transparent conductor film being patterned into numerous electrode pads arranged in rows and columns of a two-dimensional matrix, surface areas of the electrode pads vary depending on the location of the touch area, and coordinates of the touch locations are sensed based on a proportion of charge signals of the touch locations due to differences in the surface areas of the electrode pads, the sensing circuit comprising:

a comparator in which one input is an output of a current source for providing current to each of groups of the electrode pad, and the other input is a standard voltage;

a timer circuit for counting output magnitude of the comparator as a number of pulses; and a computing circuit for computing coordinate data of the touch locations based on output of the timer circuit.

* * * * *